(12) United States Patent
Shimizu et al.

(10) Patent No.: US 6,407,778 B1
(45) Date of Patent: Jun. 18, 2002

(54) VIDEO SIGNAL PROCESSING

(75) Inventors: Yutaka Shimizu, Ota; Seiya Ota, Aichi-ken, both of (JP)

(73) Assignee: Sanyo Electric, Co., Ltd., Osaka (JP)

( * ) Notice: Subject to any disclaimer, the term of this patent is extended or adjusted under 35 U.S.C. 154(b) by 0 days.

(21) Appl. No.: 09/039,664

(22) Filed: Mar. 16, 1998

(30) Foreign Application Priority Data

Mar. 31, 1997 (JP) .............................................. 9-081470

(51) Int. Cl.[7] .......................... H04N 9/74; H04N 5/445
(52) U.S. Cl. ...................... 348/581; 348/567; 345/668; 345/671; 382/298
(58) Field of Search ................................ 348/561, 565, 348/567, 568, 704, 581, 582, 562, 714, 718; 345/670, 671, 669, 668, 667; 382/298, 299; H04N 7/74, 5/445

(56) References Cited

U.S. PATENT DOCUMENTS

| 5,172,103 A | * 12/1992 | Kita | 345/667 |
| 5,291,308 A | * 3/1994 | Onodera | 358/404 |
| 5,357,601 A | * 10/1994 | Kagawa | 345/629 |
| 5,818,416 A | * 10/1998 | Hwang | 345/667 |
| 6,008,854 A | * 12/1999 | Shimizu | 348/445 |
| 6,160,590 A | * 12/2000 | Shimizu et al. | 348/567 |

FOREIGN PATENT DOCUMENTS

JP 9-116827 2/1997

* cited by examiner

*Primary Examiner*—Michael H. Lee
(74) *Attorney, Agent, or Firm*—Fish & Richardson P.C.

(57) ABSTRACT

A video signal processing circuit includes an input processor configured to modify an input video signal in accordance with image magnification data and a buffer memory for storing the modified video signal. The processing unit also includes a write control unit configured to control a write function to the buffer memory by generating a write control signal in accordance with the image magnification data. The write control unit includes a calculating circuit configured to calculate image size data on the basis of the write control signal in response to a change in the image magnification data. The write control unit also includes an inhibition circuit configured to inhibit the write function to the buffer memory at least while the calculation circuit calculates the image size data. The processing unit further includes a read control unit for controlling reading from the buffer memory in accordance with the calculated image size data. A method of processing a video signal also is disclosed.

22 Claims, 6 Drawing Sheets

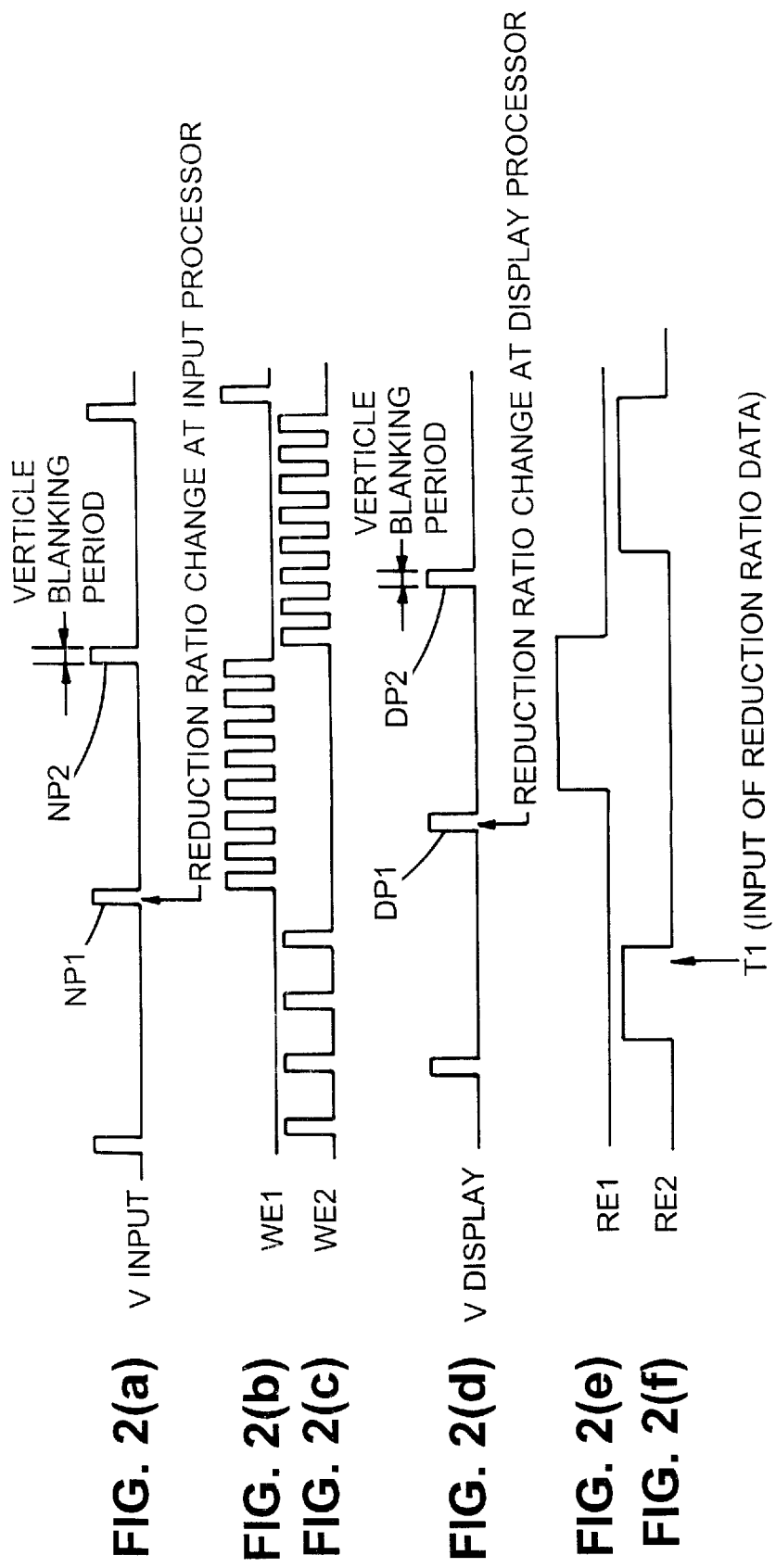

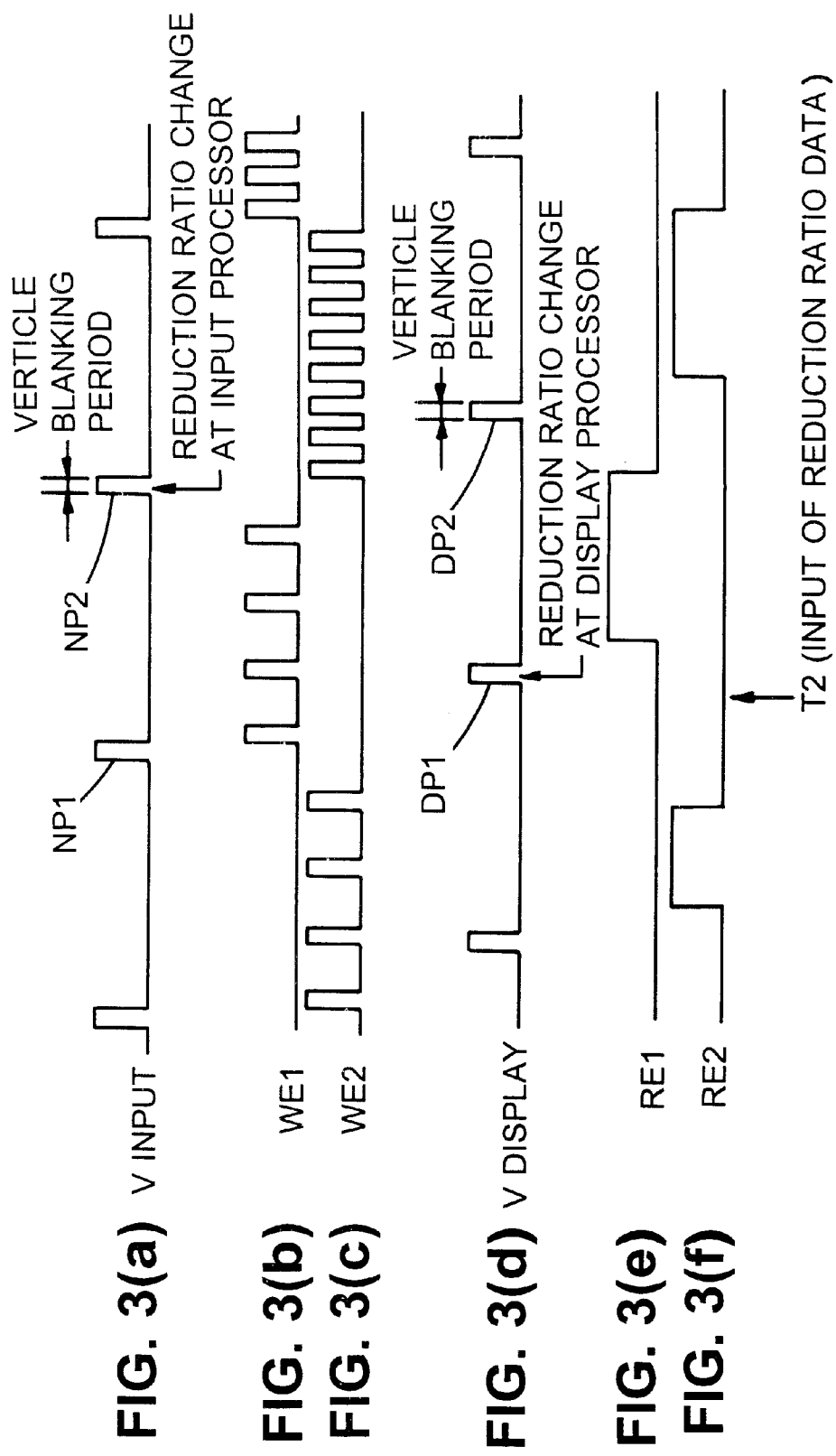

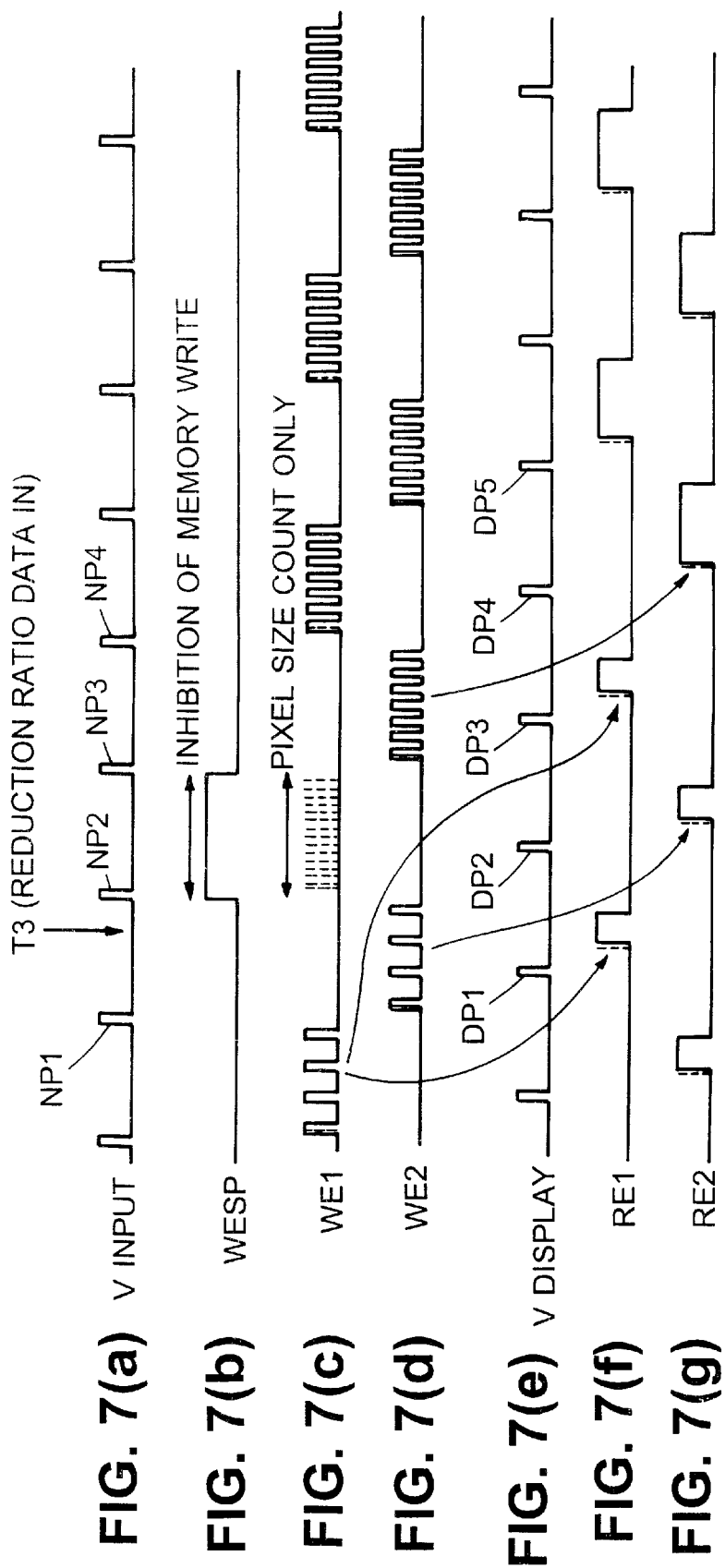

US 6,407,778 B1

VIDEO SIGNAL PROCESSING

This application claims the priority of Japanese Patent Application No. Hei 9-81470, filed Mar. 31, 1997, which is incorporated herein by reference in its entirety.

BACKGROUND

The invention relates generally to video signal processing.

In the television industry, the Picture In Picture ("PIP") function is a well-known function used to display multiple pictures on a screen or window. Future multimedia applications, however, demand additional display functions. For example, performing a window display function at an arbitrary reduction ratio, as widely developed in the operating environment of the personal computer, is demanded in the television industry as well. To display other pictures on the window, a buffer memory such as a field memory or a frame memory for synchronizing the picture and the picture is required.

As shown in the reduced video signal processing circuit of FIG. 1, an input video signal of a picture is entered into an input processor. The picture is reduced according to reduction ratio data K by using an internal filter circuit 10 so that the reduced video signal is transmitted to field memories 2, 3. A control block 4 includes an input video clock generator 5 for controlling performance of a write function to the field memories 2, 3, and a display video clock generator 6 for controlling performance of a read function from the field memories 2, 3. The reduction ratio data K is fed from an external source to the input video clock generator 5, from which they are entered into the input processor 1.

The input video clock generator 5 receives a horizontal synchronizing signal ("H input") and a vertical synchronizing signal ("V input") of the input video signal and generates a write clock signal, WCLK, having the same rate as that of a pixel clock synchronized with the H input. The input video clock generator 5 also generates write enable signals, WE1 and WE2, for enabling the field memories 2, 3 alternately at the field unit for an effective display period of the input video signal. Additionally, the input video clock generator 5 generates a write reset signal, WRST, for resetting the write addresses of the field memories 2, 3 at the rise of the write enable signals. The field memories 2, 3 are equipped individually with address counters for designating the write and read addresses independently. The writing address counter is reset by the signal WRST and increments the write addresses by counting the write clock signals WCLK while the enable signals WE1 and WE2 are at a high level. The reduced video signal from the input processor 1 then is written in the field memories 2, 3.

When the value of the reduction ratio data K is at 1, in other words, when there is no reduction, the write enable signals WE1 and WE2 are kept at the high level for the effective video period. When the reduction ratio data K is lower than 1, the reduction ratio data K is used to control when the enable signals WE1 and WE2 are high. If, for example, the value of the reduction ratio data K is ½, the high level and the low level are repeated at alternating pixels, as shown at FIG. 2(b) and FIG. 2(c).

The input video clock generator 5 calculates image size data SIZ on the basis of the reduction ratio data K and transmits the data SIZ to the display video clock generator 6. If the number of horizontal pixels and the number of vertical pixels from the input video signal are 640 and 480, respectively, and if the reduction ratio data K is ½, the image size data SIZ are 320 and 240 for the horizontal SIZ(H) and the vertical SIZ(V), respectively.

To read the reduced video signals from the field memories 2, 3, the display video clock generator 6 receives both the horizontal synchronizing signal ("H display") and the vertical synchronizing signal ("V display") from the display video signals. Alternatively, the display video clock generator 6 can receive the picture and the display position data (X, Y) indicating the window display position of the reduced image. The display video clock generator 6 generates a read clock signal RCLK at the same rate as that of the pixel clock synchronized with the H display. The display video clock generator 6 also generates read enable signals RE1 and RE2 enabling the field memories 2, 3 alternately at the unit of field for the effective display period of the display video signals. Additionally, the display video clock generator 6 generates a read reset signal RRST for resetting the read addresses of the field memories 2, 3 at the rise of the read enable signals. The reading address counters in the field memories 2, 3 are reset by the signal RRST and increment the read addresses by counting the read clocks RCLK while the enable signals RE1 and RE2 are at the high level. The reduced video signals then are read from the field memories 2, 3.

The H display and the V display may be generated, if known in advance, by the display video clock generator 6 so that the various signals RRST, RCLK, RE1 and RE2 can be generated on the basis thereof.

As indicated by FIG. 4, the display position data (X, Y) indicates the display position of the picture (of the display video signal), and the image size data SIZ(H), SIZ(V) indicates the size of the picture (of the input video signals) to be displayed on the window. Based on the image size data SIZ(H), SIZ(V) and the image position data (X, Y), the display video clock generator 6 sets the read enable signals RE1, RE2 to the high level only for the effective display period so that the display of FIG. 4 can be realized (see FIG. 2(e) and FIG. 2(f)). In contrast to the input side, the high level signals are generated continuously.

The image size data SIZ(V), SIZ(H) and the image position data (X, Y) are transmitted from the display video clock generator 6 to a display processor 7 located downstream of the field memories 2, 3. The display processing for the window display, such as the framing of the reduced video signals or the addition of background data, is performed by the display processor 7, and the result is provided as display video signals.

To change the reduction ratio arbitrarily, the processing content has to be changed at both the write side and the read side according to the reduction ratio data. However, the displayed image is disturbed if the processing content is changed during performance of the writing and reading functions. To prevent this disturbance, the change in the reduction ratio is performed during a vertical blanking interval.

There is a delay with respect to the change in the reduction ratio between the write side and the read side because the V input and the V display are not synchronized. If new reduction ratio data K is entered at a time T1 when the phase of the V display is delayed from the V input (see FIG. 2(f)), the reduction ratio data K is changed at the input video clock generator 5 and the input processor 1 during a vertical blanking interval NP1, after T1 (see FIG. 2(a)). The subsequent display reduction and the write control are performed according to the changed reduction ratio. In the display video clock generator 6 and the display processor 7, however, the reduction ratio is changed during a vertical blanking interval DP1, after T1 (see FIG. 2(d)). The interval DP1 occurs after the interval NP1 so that the video signals, as written according to the changed reduction ratio, are subjected to the display processing during and after the interval DP1.

If, however, the new reduction ratio data K is entered at a time T2 after the vertical blanking interval NP1 at the V input but before the vertical blanking interval DP1 at the V display (see FIG. 3), the reduction ratio is changed in the input video clock generator 5 and the input processor 1 during a vertical blanking interval NP2, after T2 (see FIG. 3(a)). In the display video clock generator 6 and the display processor 7, however, the change in the reduction ratio data K is performed during the vertical blanking interval DP1, before NP2, in other words, prior to the change in the reduction ratio data K at the input side. For the display period following the interval DP1, the video signals prior to the change in the reduction ratio data K should be displayed without a change in the magnification. Instead, however, the video signals will be reduced according to the image size data, thereby causing distortions in the image displayed on the window or screen. The reduction ratio data K, therefore, cannot be changed if the window is displayed continuously.

In Japanese Patent Application No. 7-267107, we have proposed a reduced video signal processing circuit for controlling the reading of a reduced video signal, if the reduction ratio data is changed by writing the image size data as a header together with the reduced video signals in a buffer memory and by reading the image size data at the display side.

According to this construction, after the image size data are fixed, the display can be processed reliably at the display side at a new reduction ratio from the video signals for which the reduction ratio has been changed. The image size data are determined by counting the horizontal write enable signal WEH and the vertical write enable signal WEV for generating the write enable signals WE1 and WE2, respectively, for one horizontal period of the H input and for a one-field period of the V input. For the one-field period just following the change in the reduction ratio, the video signal itself is processed at the new reduction ratio, but the image size data cannot add the data after the change in the reduction ratio thereto. Thus, the reduction ratios between the reduced video signal to be written in the buffer memory and the image size data are different. Such problems can occur when an image is magnified, as well as when the image is reduced.

SUMMARY

In general, according to one aspect of the invention, a video signal processing circuit includes an input processor configured to modify an input video signal in accordance with image magnification data and a buffer memory for storing the modified video signal. The processing circuit further includes a write control unit coupled to an output of the input processor and configured to control a write function to the buffer memory by generating a write control signal in accordance with the image magnification data. The write control unit includes a calculating circuit configured to calculate image size data on the basis of a write control signal in response to a change in the image magnification data. The write control circuit also includes an inhibit circuit configured to inhibit the write function to the buffer memory while the calculation circuit calculates the image size data. In addition, the processing circuit includes a display processor coupled to the buffer memory and configured to read the modified video signal from the buffer memory. The processing circuit further includes a read control unit for controlling reading from the buffer memory in accordance with the calculated image size data.

According to another aspect of the invention, a method of processing an input video signal includes receiving image magnification data and modifying the input video signal in accordance with the image magnification data. The method further includes calculating image size data based on the image magnification data and inhibiting writing the modified video signal to a buffer memory at least during calculation of the image size data.

In various implementations, one or more of the following features are present. The calculated image size data can be transmitted to the buffer memory together with the modified video signal. For example, the image size data can be transmitted as part of a header.

The processing circuit can be configured to receive a change in image magnification data only during predetermined intervals when information cannot be written to the buffer memory. Writing the video signal to the buffer memory can be inhibited during a period commencing with one such predetermined interval which immediately follows the change in the image magnification data and ending when a next predetermined interval begins.

In some implementations, the image magnification data can represent a number equal to or less than one, and the input processor can be configured to reduce or enlarge the input video signal in accordance with the image magnification data.

A display processor can be configured to read the calculated image size data from the buffer memory and to transmit the calculated image size data to the read control unit. The read control unit can be configured to receive display position data and to transmit the display position data to the display processor. The display processor can transmit the modified video signal for display on a television screen in accordance with the display position data.

One or more of the following advantages can be provided by various implementations of the invention. Generally, by inhibiting the write function in the field memories for the period just after the change in the image magnification data, the image size data and the modified video signals can be provided to the display side of the system more accurately. The change in the image magnification can be handled reliably regardless of the timing of the change. Thus, the image magnification can be changed while the reduced or enlarged image remains displayed on the window. The invention can be used in connection with reducing or enlarging an image.

BRIEF DESCRIPTION OF THE DRAWINGS

FIGS. 2(a)–2(f) are a timing diagram associated with the reduced video signal processing circuit of the prior art.

FIGS. 3(a)–3(f) are another timing diagram associated with the reduced video signal processing circuit of the prior art.

FIGS. 7(a)–7(g) are a timing diagram associated with one implementation of the invention.

DESCRIPTION OF THE PREFERRED EMBODIMENTS

Figure 1:
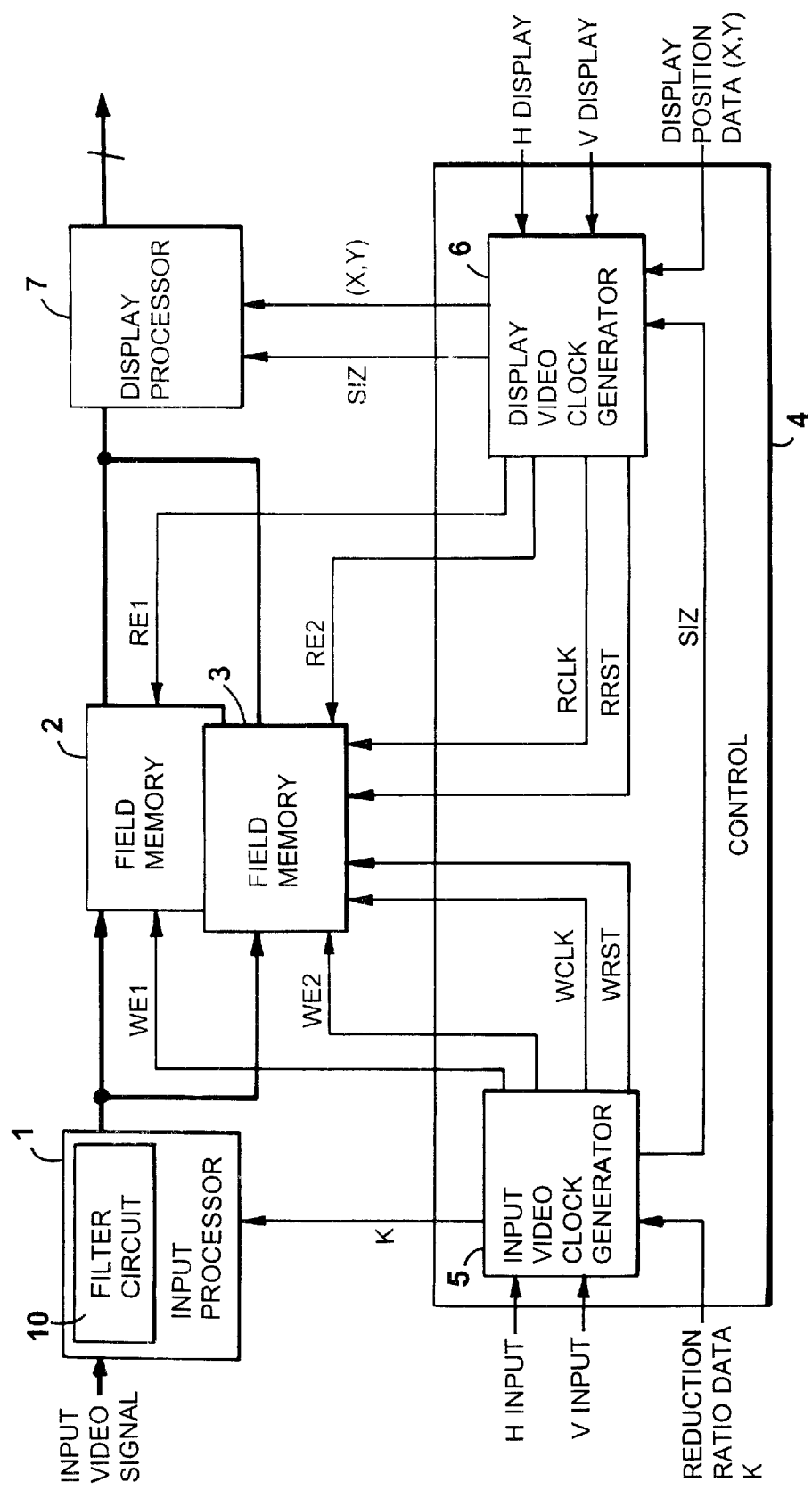
FIG. 1 is a block diagram showing a reduced video signal processing circuit of the prior art.
Figure 5:
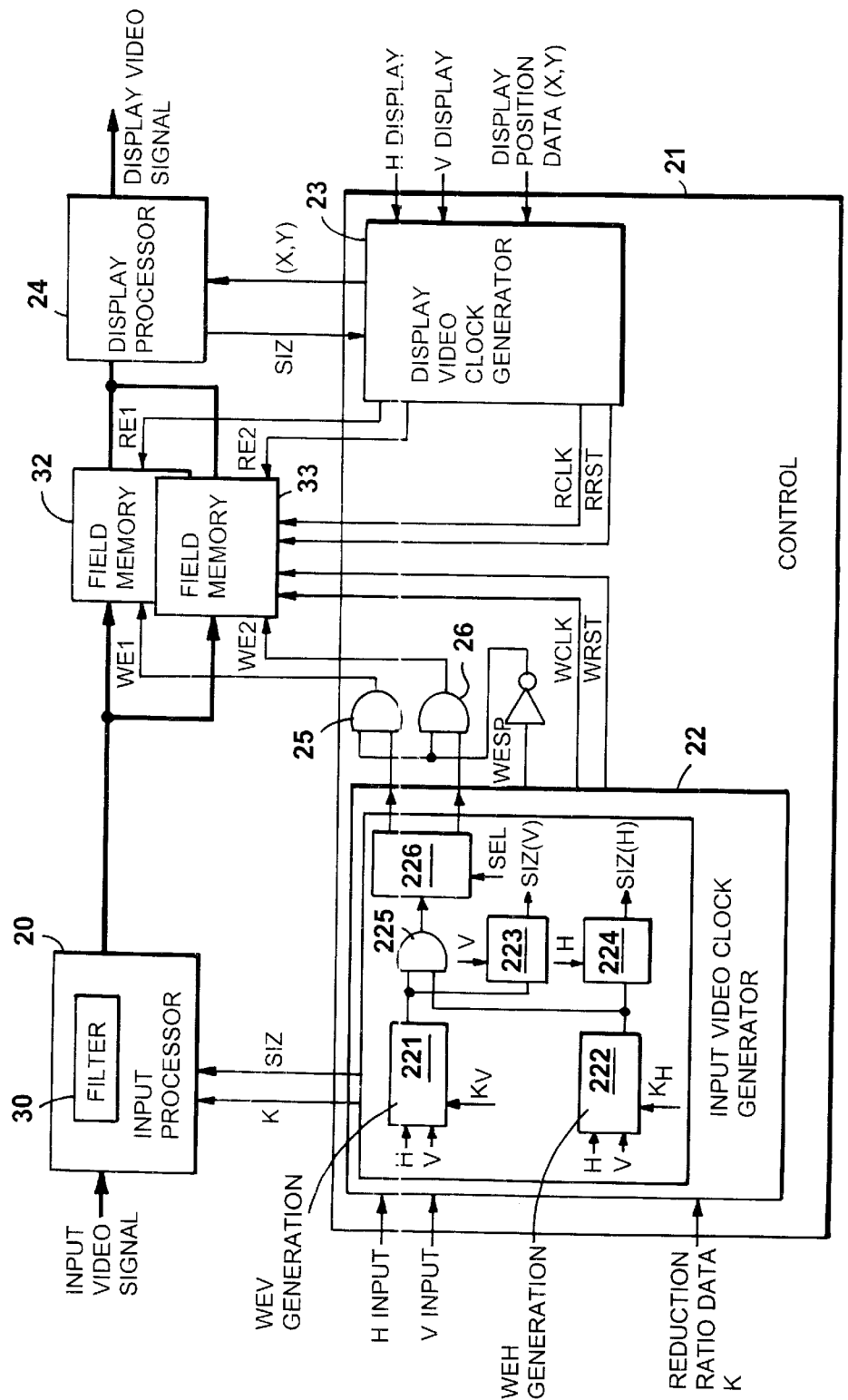
FIG. 5 is a block diagram showing a reduced video signal processing circuit according to one implementation of the invention.

As shown in FIG. 5, a video signal processing circuit includes an input processor 20, a control block 21, an input video clock generator 22, a display video clock generator 23, a display processor 24 and field or buffer memories 32, 33. The input processor 20 includes a filter circuit 30. Items 20, 24, 30, 32 and 33 correspond generally to items 1, 7, 2, 3 and 10 in FIG. 1.

The input video clock generator 22 includes a vertical write enable ("WEV") generator 221 which is responsive to vertical reduction ratio data KV of reduction ratio data K for generating a vertical write enable signal WEV to take a high level only in a line to be written for a one-field period. The input video clock generator 22 also includes a horizontal write enable ("WEH") generator 222 which is responsive to horizontal reduction ratio data KH for generating a horizontal write enable signal WEH to take a high level only at a dot to be written for one horizontal period. The input video clock generator 22 further includes counters 223, 224, an AND gate 225 and a selector 226. The counter 223 is reset by a V input for calculating vertical image size data SIZ(V) by counting the vertical write enable signal WEV. The counter 224 is reset by an H input to calculate horizontal image size data SIZ(H) by counting the horizontal write enable signal WEH. The AND gate 225 provides an enable signal WE in response to receiving the write enable signals WEV and WEH. The selector 226 is responsive to a select signal SEL for repeating high and low levels alternately, in synchronism with the V input, to provide an enable signal WE1 at its output for the period of the high level and an enable signal WE2 for the period of the low level.

An AND gate 25 receives the WE1 signal from the selector 226 as a first input. Similarly, an AND gate 226 receives the WE2 signal from the selector 226 as a first input. The input video clock generator 22 also provides a write inhibition signal WESP for the one-field period just after a change in the reduction ratio data K. An inverted output of the write inhibition signal WESP is provided as a second input to each of the AND gates 25, 26.

The operation of implementation of FIG. 5 is explained below with reference to FIG. 7. When new reduction ratio data K is entered at a time T3 (see FIG. 7(a)), the input video clock generator 22 and the input processor 20 change the reduction ratio during a vertical blanking interval NP2 just after T3 so that the subsequent reduction and write controls are executed according to the changed reduction ratio. The write enable signals WEV and WEH are generated by the WEV generator 221 and the WEH generator 222 based on the changed reduction ratio. The counters 223 and 224 calculate the image size data SIZ(V) and SIZ(H), respectively, by counting the write enable signals WEV and WEH for a one-field period between NP2 and NP3.

The write inhibition signal WESP is brought to a high level during the interval from NP2 to NP3 (FIG. 7(b)). During that interval, the write enable signal WE1 is not fed to the field memory 2 (see FIG. 7(c)) so that the image size data and the reduced video signals are not written to the field memory 32. For the one-field period immediately following NP3, the image size data SIZ(V) and SIZ(H) are already fixed, and the write inhibition signal WESP is at a low level. As a result, the write enable signal WE2 is fed to the field memory 33 (see FIG. 7(d)). The reduced video signals and the calculated image size data SIZ corresponding to the changed reduction ratio are written as a header, through the input processor 20, to the field memory 33 (see FIG. 6). As the write enable signals WE1 and WE2 are provided at the output of the AND gates 25, 26, the image size data SIZ and the reduced video signals are written alternately in the field memories 32 and 33.

The written image size data SIZ is read from the field memories 32 and 33 and provided to the display processor 24 on the basis of various reading control signals coming from the display video clock generator 23. The image size data is retained by the display processor 24 and transmitted to the display video clock generator 23. The display video clock generator 23 provides the reading control signals RCLK, RRST, RE1 and RE2 on the basis of the image size data SIZ and the display position data (X, Y) entered from an external source, so that the reduced video signals are read from the field memories 32 and 33. The image size data SIZ is retained in the display processor 24, and the display position data (X, Y) is entered from the display video clock generator 23 to the display processor 24, so that the window display processing is performed on the basis of that data according to known techniques. Thus, the processed data is transmitted as video signals to an outside TV receiver so that they are displayed on the window or screen.

As indicated by FIGS. 7(e)–(g), for the one-field period just after DP1 and DP2 (FIG. 7(e)), the image size data and the reduced video signals stored in the field memories 32 and 33 prior to the change in the reduction ration data K are read individually. For the next one-field period just after DP3, the image size data before the change and the reduced video signals stored in the field memory 32 just before NP1 are read. For the one-field period just after DP4, the image size data after the change and the reduced video signals, as stored in the field memory 33 just after NP3, are read. The display video clock generator 23 and the display processor 24 then process the video signals.

Figure 6:
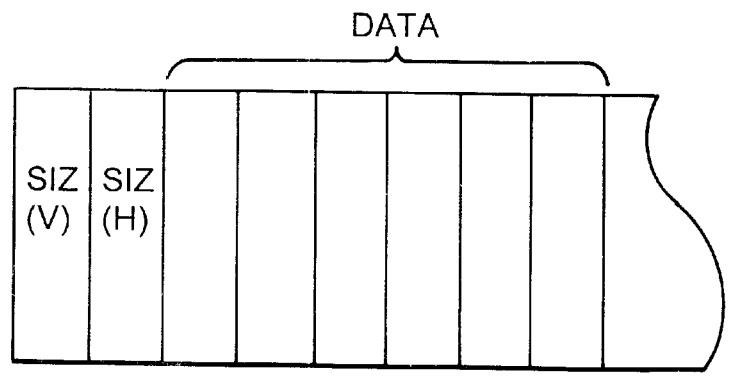
FIG. 6 illustrates an exemplary format for writing data to a field memory according to the invention.
Figure 4:
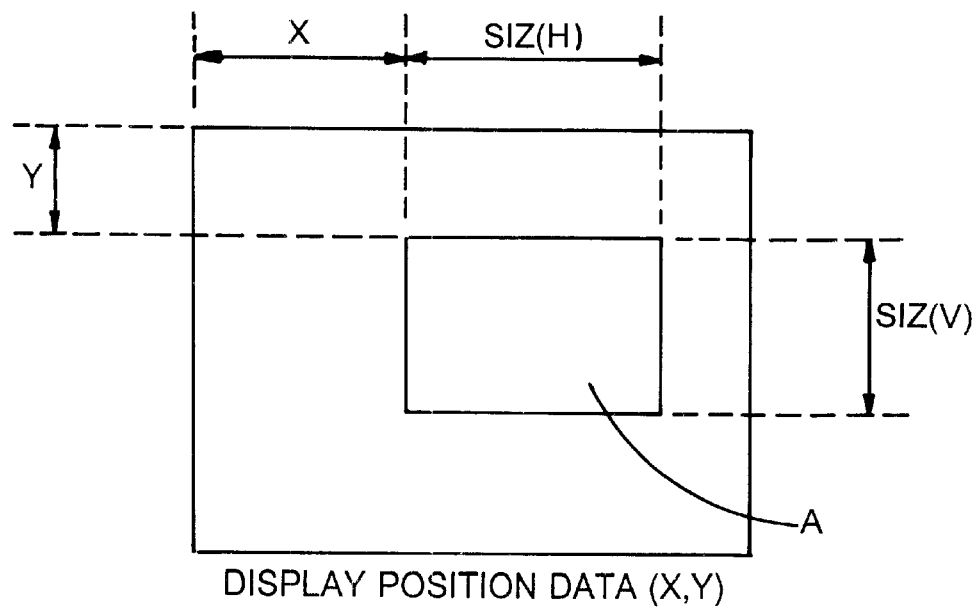
FIG. 4 illustrates an exemplary window display.

Compared to the system described above in the Background section, the amount of data to be written and read increases by the amount of data included in the header (FIG. 6). Thus, the write and read enable signals WE1, WE2, RE1 and RE2 are raised somewhat earlier (see dotted lines in FIG. 7).

Generally, by inhibiting the write function in the field memories 32, 33 is inhibited for the one-field period just after the change in the reduction ratio, the image size data and the reduced video signals can be equalized more reliably by the reduction ratio.

Although the foregoing implementation has been described with respect to reducing an image, it can be applied to magnifying or enlarging an image as well.

According to the invention, the change in the image magnification can be reliably coped with even if it is done anytime, so that the image magnification can be changed while leaving the reduced or magnified image displayed on the window. When the image magnification data are changed, moreover, the write of the buffer memory is inhibited while the image size data are being calculated. As a result, the image size data as the header and the reduced or magnified video signal are reliably equalized in the image magnification thereby to cause no distortion in the image.

Other implementations are within the scope of the following claims.

What is claimed is:

1. A video signal processing circuit comprising:
   an input processor configured to modify an input video signal in accordance with image magnification data;
   a buffer memory coupled to an output of the input processor for storing the modified video signal;

a write control unit coupled to the buffer memory and configured to control a write function to the buffer memory by generating a write control signal in accordance with the image magnification data, wherein the write control unit includes (a) a calculating circuit configured to calculate image size data on the basis of a write control signal in response to a change in the image magnification data; and (b) an inhibit circuit configured to inhibit the write function to the buffer memory while the calculation circuit calculates the image size data;

a display processor coupled to the buffer memory and configured to read the modified video signal from the buffer memory; and a read control unit coupled to the buffer memory for controlling reading from the buffer memory in accordance with the calculated image size data.

2. The video signal processing circuit of claim 1 wherein the calculated image size data is transmitted to the buffer memory together with the modified video signal.

3. The video signal processing circuit of claim 2 wherein the calculated image size data is transmitted to the buffer memory as part of a header.

4. The video signal processing circuit of claim 1 wherein the input processor is configured to reduce the input video signal in accordance with the image magnification data.

5. The video signal processing circuit of claim 1 wherein the input processor is configured to enlarge the input video signal in accordance with the image magnification data.

6. The video signal processing circuit of claim 1 wherein the image magnification data represents a number equal to or less than one.

7. The video signal processing circuit of claim 1 configured to receive a change in image magnification data only during predetermined intervals when information cannot be written to the buffer memory, and wherein the inhibit circuit is configured to inhibit the write function to the buffer memory during a period commencing with such a predetermined interval that immediately follows the change in the image magnification data and ending when a next predetermined interval begins.

8. The video signal processing circuit of claim 2 wherein the display processor is configured to read the calculated image size data from the buffer memory.

9. The video signal processing circuit of claim 8 wherein the display processor is configured to transmit the calculated image size data to the read control unit.

10. The video signal processing unit of claim 9 further comprising a television screen, wherein the read control unit is configured to receive display position data and to transmit the display position data to the display processor, and wherein the display processor transmits the modified video signal for display on a television screen in accordance with the display position data.

11. A method of processing an input video signal, the method comprising:

receiving image magnification data;

modifying the input video signal in accordance with the image magnification data;

calculating image size data based on the image magnification data;

inhibiting writing the modified video signal to a buffer memory at least during calculation of the image size data.

12. The method of claim 11 further comprising transmitting the calculated image size data to the buffer memory together with the modified video signal.

13. The method of claim 12 further comprising reading the image size data and the modified video signal from the buffer memory.

14. The method of claim 13 further comprising displaying a picture corresponding to the modified video signal on a television screen.

15. The method of claim 14 further comprising receiving display position data and displaying the picture on the television screen in accordance with the position data.

16. The method of claim 13 comprising controlling reading of the modified video signal from the buffer memory in accordance with the calculated image size data.

17. The method of claim 12 wherein transmitting the calculated image size data to the buffer memory comprises sending the image size data to the buffer memory as part of a header.

18. The method of claim 11 wherein modifying the video signal comprises reducing the video signal in accordance with the image magnification data.

19. The method of claim 11 wherein modifying the video signal comprises enlarging the video signal in accordance with the image magnification data.

20. The method of claim 11 wherein the image magnification data represents a number equal to or less than one.

21. The method of claim 11 further comprising receiving a change in image magnification data only during predetermined intervals when information cannot be written to the buffer memory.

22. The method of claim 21 wherein inhibiting writing the video signal to a buffer memory comprises inhibiting writing the video signal to the buffer memory data during a period commencing with such a predetermined interval that immediately follows the change in the image magnification data and ending when a next predetermined interval begins.

* * * * *